Nov. 28, 1933. F. D. HANSEN ET AL 1,937,114
METHOD OF MAKING METAL COVERS FOR AUTOMOBILE TIRES
Original Filed July 15, 1929 2 Sheets-Sheet 1

Inventors:
Frederick D. Hansen
Herbert W. Tinker

Nov. 28, 1933.   F. D. HANSEN ET AL   1,937,114
METHOD OF MAKING METAL COVERS FOR AUTOMOBILE TIRES
Original Filed July 15, 1929   2 Sheets-Sheet 2
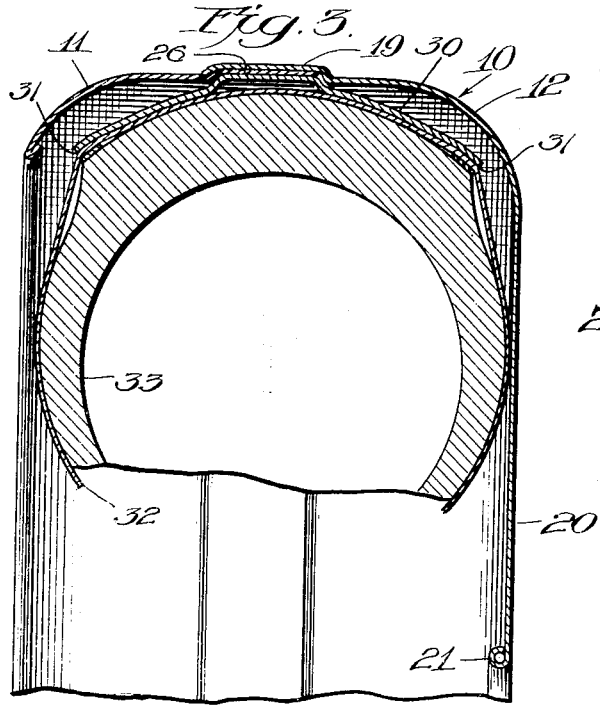
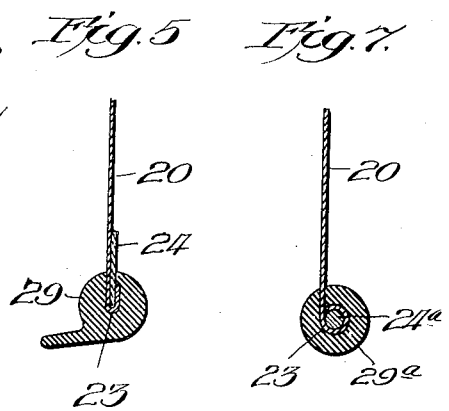
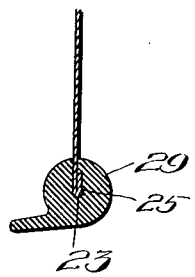
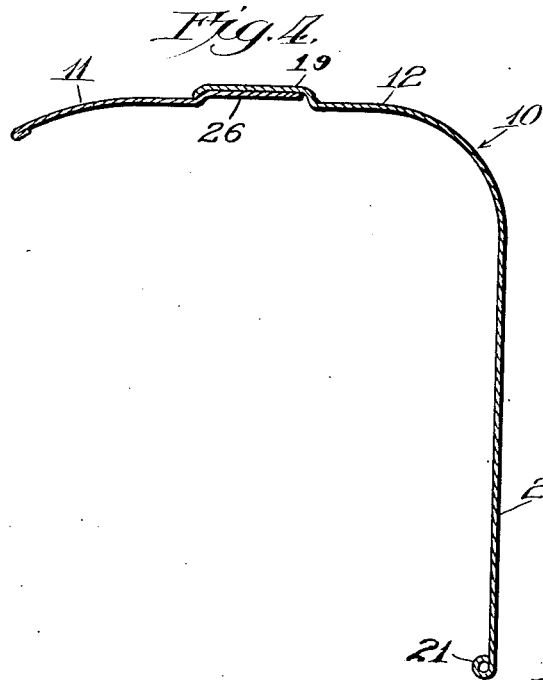
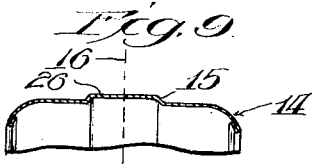
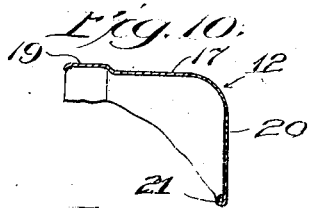

Patented Nov. 28, 1933

1,937,114

UNITED STATES PATENT OFFICE 1,937,114

METHOD OF MAKING METAL COVERS FOR AUTOMOBILE TIRES

Frederick D. Hansen and Herbert W. Tinker, Milwaukee, Wis., assignors, by mesne assignments, to Federal Pressed Steel Corporation, Milwaukee, Wis., a corporation of Delaware Application July 15, 1929, Serial No. 378,309
Renewed October 16, 1933

9 Claims. (Cl. 113—116)

Our invention relates to metal covers for automobile tires.

The principal object of our invention is to provide a cover of the non-flexible type for encasing the spare tires of motor vehicles, which is characterized by ease of handling, both in application to and in removing from a tire, an attractive appearance and a simplicity of construction.

A further object is to devise a method of making tire covers, formed of metal and shaped to closely approximate the circumferential and transverse curvature of a tire, which is characterized by simplicity, a minimum number of operations, and its practice by a high production rate.

Our invention is intended generally as a substitute for the flexible cover of waterproof material now in common use as a protective device for spare tires and is concerned more particularly with a metallic casing. As a matter of appearance, it is highly desirable to approximate closely the dual curvature of a tire, which operative requirements render impractical the production of a metallic casing from a single piece of material. Due to the necessity of bending the metal, both around the circumferential profile and inwardly in the direction of the axis of the tire to conform to the transverse tread profile thereof, a smooth, undistorted bending could hardly be achieved without providing one edge with a plurality of notches, a solution which obviously would detract from the appearance of the finished article and entail difficult manufacturing operations.

Accordingly, it is one of the expressed objects of our invention to devise a method of forming the cover which avoids the above objection through a novel conception of uniting two separately curved portions, the manner of forming which is arranged to provide for a high production rate of the finished cover.

Another object of the invention is to provide a metal tire cover having a portion curved circumferentially and transversely to conform substantially to the tread of the tire and another portion adapted to form a side shield, the cover constituting two pieces having marginal overlapping ribs permanently secured together by concealed means.

These and further objects of our invention will be set forth in the following specification, reference being had to the accompanying drawings, and the novel means by which said objects are effectuated will be definitely pointed out in the claims.

In the drawings:

Figures 1 and 2 are front and rear elevations, respectively, of our improved tire cover;

Figs. 3 and 4 are sections along the lines 3—3 and 4—4, respectively, in Fig. 2;

Figs. 5 and 6 are sections along the lines 5—5 and 6—6, respectively, in Fig. 2;

Fig. 7 illustrates a modification of the structure shown in Fig. 5;

Figs. 8, 9 and 10 are views showing diagrammatically the several steps employed in making our improved cover from sheet metal.

Figure 1:
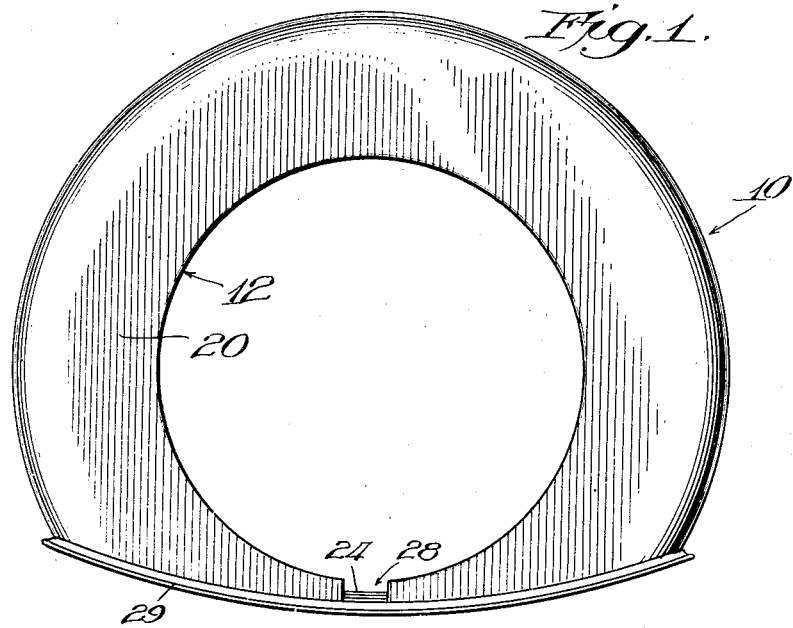

The numeral 10 designates our improved tire cover which is preferably formed of metal and composed of two parts 11 and 12, see Figs. 3 and 4, appropriately shaped and united as hereinafter described. The part 11 is formed from a strip or sheet 13, see Fig. 8, which is rolled and bent according to the degrees of transverse and circumferential curvatures required as indicated diagrammatically in Fig. 9. The element 14 so formed is provided with an offset ridge 15 disposed midway between the side edges of said element and extending the length thereof, the width of said ridge being twice that required for the corresponding feature of the part 11. Accordingly, when the element 14 is centrally cut along the line 16, two of the parts 11 will be formed.

The part 12 of the cover is rolled and bent from a separate sheet according to the degree of circumferential curvature required and also to the degree of transverse tread curvature required, as indicated by the number 17 in Fig. 10. The peripheral portion 17 is provided with an offset ridge portion 19 extending along the edge thereof for its full length and having a width equal to one-half of the width of the ridge 15 formed on the element 14. The part 12 of the cover also forms an annular shield 20 which extends inwardly from the portion 17 and is curled along the inner edge thereof, as at 21, to present a finished appearance.

We would point out that it would be impractical from a production standpoint, if not in fact impossible, to form a metal tire cover of this dual curvature from a single piece of metal. In forming the piece shown in Fig. 9 from the strip shown in Fig. 8, it is a relatively simple matter to rigidly hold the edges of the strip in the rolls or die and expand the metal to impart to it the transverse and circumferential curves and the ridge. It is likewise a comparatively simple operation to form the piece 12 from a single piece in the form of a disk, the outer edge portion of the disk being bent over the periphery of a die member to form the portion 17. The center of the portion 20 is then cut out to form the hole. The ridge 19 is rolled on an ordinary rolling machine. The two parts, however, could not be very well formed of one piece as the edges of the cover are different distances from the axis and hence difficult to hold during the forming operation or operations and it would require considerable compression or contraction of the metal to transversely curve the inner end portion of the cover inwardly, which is not practical without providing a plurality of transverse notches or slits. Even if it were possible to form the cover from a single piece without notches, yet the dies would be so expensive and complicated and the operation so difficult and uncertain as to make it impractical and the cost prohibitive.

Figure 2:
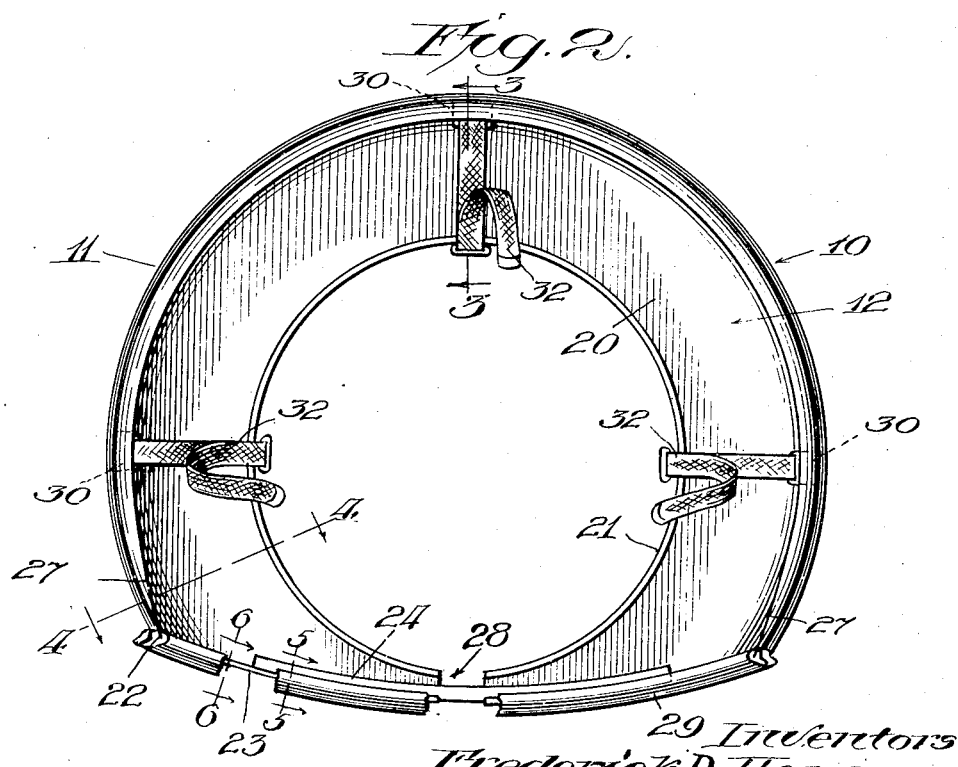

The general profile of the cover, as shown in Figs. 1 and 2, is generally parti-circular, the lower edge of the cover being defined by the end edges 22 and 23 of the parts 11 and 12, respectively, which together are shaped to conform to the running board or fender of a vehicle.

The parts 11 and 12 of the cover having been formed as above described, they are united by placing the ridge 19 of the part 12 in overlapping relation to the ridge 26 of the part 11. The parts 11 and 12 will then be permanently secured together by concealed means in any approved manner, but preferably by spot welding. The overlapping ribs not only form an artistic molding extending around the cover, but also serve as a neat concealed joint between the two parts, the spot-welded points being also concealed and non-protruding.

In order to suitably strengthen the lower portion of the cover along the edge 23, but at the same time to permit of a slight yielding movement for a purpose hereinafter explained, a reenforcing member 24, preferably in the form of a flat metal strip, is secured within a portion of the edge 23 which is curled as at 25, said strip bridging the gap 28. The strip 24 may be spot welded to the part 12.

The remaining length of the edge 23 and also the edge 22 of the part 11 may be simply folded back as shown in Fig. 6. A rubber cushion strip 29 encloses the edges 22 and 23 throughout the length thereof.

If desired, the reenforcing member may be simply a wire 24ª, see Fig. 7, around which the edges 22 and 23 may be curled or rolled. The cushion strip 29ª may be round in cross-section as shown in Fig. 7.

As a means of securing the tire cover to the tire, we preferably employ the arrangement shown in Figs. 2 and 3 which is fully described and claimed in the copending application of Herman Haertle, filed June 20, 1929. This arrangement consists of a plurality of strap brackets disposed in spaced relation around the inner periphery of the cover, each bracket being formed of a flexible strip 30 extending transverse of the tire tread and secured at its mid-portion to provide a pair of movable end portions thereof. Suitable openings 31 are cut in each end of the strip 30 and a strap 32 is looped through said openings across said strip for attachment around the section 33 of a tire.

In applying our improved tire cover to a tire, it will be apparent that the same may be bodily moved into position, which action is facilitated by the slightly flaring shape of the part 11 adjacent the end edges 22, as indicated by the numeral 27 in Fig. 2, and also by the slightly flexible nature of the lower portion of the cover. The covering having been so placed in position, the straps are then secured around the tire and are completely concealed by the annular shield 20, thus enhancing the general appearance of the cover.

This factor of appearance which is highly important in articles of this type is made possible of accomplishment through our improved structure and method of making the cover. This method permits the shaping of the material employed so that the cover not only approximates in shape the circumferential form of the tire, but also the transverse tread curvature thereof. Finally, the practice of the method is such that a high production rate may be secured.

For the purpose of illustration, we have described a cover which is shaped for attachment to a tire carried in a well on the running board or fender of a vehicle, but it will be understood that the application of the invention is not so limited, for it may be also utilized for tires carried in other locations. It will be understood that while we have shown one set of elements and combinations thereof for effectuating our improved tire cover and the method of making the same, the same is intended for purpose of illustration only and in nowise to restrict our article to the exact forms and structures shown, for changes may be made therein without departing from the spirit of our invention.

We claim:

1. The herein described method of making a metal tire cover shaped generally to the degrees of circumferential and transverse tread curvatures of a tire and composed of two parts each shaped with the aforesaid degrees of curvature, which consists in forming one part with a shield and from a single piece of metal, forming the other part without a shield by centrally expanding a single strip of metal and cutting it centrally to provide two of such shieldless parts, forming rib portions in the adjacent edges of said two parts and then moving said rib portions into overlapping relation and uniting the same to provide a concealed joint and a unitary cover having the appearance of a single piece.

2. The herein described method of making a metal tire carrier shaped generally to the degrees of circumferential and transverse tread curvatures of a tire and composed of two parts each shaped with the aforesaid degrees of curvature and with the radius of the rear edge of the inner part different from that of the radius of the front edge of the outer part, which consists in forming the outer part from a single flat piece of metal by bending the edge portion thereof circumferentially and transversely to curve the same and provide a circumferential ridge at the outer margin, forming the inner part by centrally expanding a single strip of metal to reversely curve it transversely and provide a central circumferential ridge, cutting said circular strip centrally to provide two such inner parts with a ridge at the tread margin of each adapted to fit upon the ridge of said first part with its free edge substantially concealed, then overlapping the ridges of the outer part and an inner part and finally integrally connecting said ridges to provide a cover having the appearance of a single piece unitary structure.

3. The method of forming a single-unit metal tire cover having transverse and circumferential curvatures approximating the transverse and circumferential curvatures of the entire surface it is to cover which comprises forming a metal sheet to a circular shape having a portion adapted to fit over one face of the tire and another portion adapted to fit over and having approximately the transverse and circumferential curvatures of a part of the tire tread, forming another metal sheet to a circular shape with approximately the transverse and circumferential curvatures of the remainder of the entire tread, forming offset ridges in the adjacent tread-covering edges of said formed sheets, and moving said ridges into nested relation and permanently uniting the same.

4. The method of forming a single-unit metal tire cover having transverse and circumferential curvatures approximating the transverse and circumferential curvatures of the entire surface it is to cover which comprises rolling and bending a metal sheet of proper size to a shape providing an L-shaped section having a side wall covering portion and a portion adapted to cover the adjacent part of the tire tread and having the same general transverse and circumferential curvatures of that part of the tire tread, rolling and bending another sheet of proper size to a shape providing another section having the same general circumferential and transverse curvatures of the remainder of the tire tread and of a width to cover the same, nesting the adjacent edge surfaces of said sections upon each other to avoid exposure of free edge portions and to conceal the joint between said sections and finally and permanently uniting said nested edge portions.

5. The method of forming a single-unit metal tire cover having transverse and circumferential curvatures approximating the transverse and circumferential curvatures of the entire surface it is to cover which comprises shaping a single metallic sheet of proper size to provide a section having a side wall covering portion and a portion adapted to cover the adjacent part of the tire tread and having the same general transverse and circumferential curvatures of that part of the tire tread, shaping another metallic sheet of proper size to provide a pair of integrally joined tread-covering sections, said sections being defined by a circumferential center line of said latter-formed sheet, and each section having the same general transverse and circumferential curvatures as the adjacent portion of the tire tread to be covered thereby, splitting said latter-formed sheet into two separate, identical sections, and overlapping the adjacent edges of one of said separated sections and said first section in such a way as to conceal the overlapped joint and permanently joining said sections together along said joint to provide a cover having the appearance of a single integral piece.

6. The method of forming a single-unit metal tire cover having transverse and circumferential curvatures approximating the transverse and circumferential curvatures of the entire surface it is to cover which comprises rolling and bending a metal sheet of proper size to a shape providing an L-shaped section having a side wall covering portion and a portion adapted to cover the adjacent part of the tire tread and having the same general transverse and circumferential curvatures of that part of the tire tread, rolling and bending another sheet of proper size to a shape providing a pair of integrally joined tread-covering sections, said sections being defined by the circumferential center line of said latter-formed sheet, and each section having the same general transverse and circumferential curvatures as the adjacent portion of the tire tread to be covered thereby, forming an offset ridge in the tread-covering edge of said first-formed sheet, forming a central offset ridge in said second-formed sheet, splitting said second-formed sheet along its circumferential center line through the center of its offset ridge providing two separate, identical sections, each with an offset ridge edge, and moving said first-named section and one of said separated sections together with their ridges in nested relation and permanently uniting the same.

7. The method of forming a metallic tire cover having the appearance of being formed from one piece of metal which comprises forming from a single sheet of metal a front portion of shape and size to cover the face of the adjacent tread portion of the tire and having substantially the transverse and circumferential curvatures of such tire portions, forming from another and single sheet of metal another section of such size and shape as to fit over and partly down behind the remainder of the tire tread portion and having substantially the transverse and circumferential curvatures of such tread portion, so shaping and moving the adjacent edges of said sections into overlapping relation that joint edges are not exposed, and finally securing said sections together along their overlapped edges without further outwardly extending the outer surface of the cover.

8. The method of forming a metal tire cover having transverse and circumferential curvatures approximating the transverse and circumferential curvatures of the entire surface it is to cover which comprises forming a metal sheet to a circular shape having a portion adapted to fit over one face of the tire and another portion shaped to fit over and having approximately the transverse and circumferential curvatures of a part of the tire tread, forming another metal sheet into a discontinuous ring and to a circular shape with approximately the transverse and circumferential curvatures of the remainder of the entire tread but not of such depth as to completely cover the other face of the tire, forming offset ridges in the adjacent tread covering edge of said formed sheets, and moving said ridges into nested relation whereby they may be secured together.

9. The method of forming a metallic tire cover having the appearance of being formed from one piece of metal which comprises forming from a single sheet of metal a front portion of a shape and size to cover the face and the adjacent tread portion of the tire and having substantially the transverse and circumferential curvatures of said tire portion, forming from another and single sheet of metal another section in the form of a split ring and of such size and shape as to fit over and partly down behind the remainder of the tire tread portion and having substantially the transverse and circumferential curvatures of such tread portion, and so shaping and moving the adjacent edges of said sections into overlapped relation that joint edges are not exposed, and whereby said overlapped edges may thereafter be held together.

FREDERICK D. HANSEN.
HERBERT W. TINKER.